Figure 1:
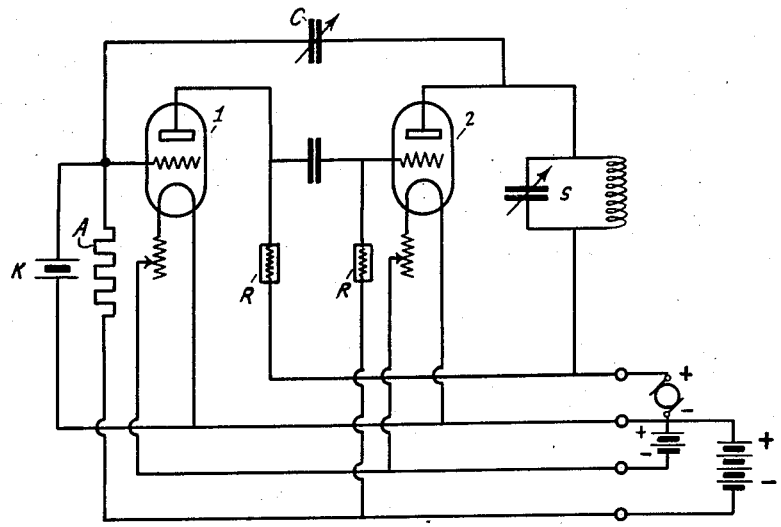

Jan. 2, 1934.  K. HEEGNER  1,941,472

TRANSMITTER TUBE CIRCUIT

Original Filed March 2, 1927

INVENTOR
KURT HEEGNER
BY Ira J. Adams
ATTORNEY

Patented Jan. 2, 1934

1,941,472

UNITED STATES PATENT OFFICE 1,941,472

TRANSMITTER TUBE CIRCUIT

Kurt Heegner, Berlin, Germany, assignor to Telefunken Gesellschaft fur Drahtlose Telegraphie m. b. H., Berlin, Germany, a corporation of Germany Application March 2, 1927, Serial No. 172,144, and in Germany March 5, 1926. Renewed September 26, 1930

1 Claim. (Cl. 250—36)

The use of a piezo-electric crystal to stabilize the frequency of a tube transmitter has been suggested in many works as is well known (see Cady, Proc. Inst. Radio Engineers, volume 10, 1922, page 73).

The arrangement of the circuit utilizing the piezo-crystal has heretofore been to have a tube connected so as to have self-oscillations take place, due to internal capacitance; the crystal being inserted between the grid and the cathode of the tube, while the plate circuit which contains the oscillation circuit, was electrically coupled to the grid circuit only by means of the electrode capacitance. In such an arrangement it is well known that the self excitation will be occasioned whenever the resultant impedance between the grid and filament becomes inductive. To realize this, it is customary to connect a choke coil in parallel with the crystal. Such an arrangement, however, considering wave constancy is shown by experiment to involve certain disadvantages making the above mentioned method not quite measure up to the requirements of completely stabilizing the frequency.

The present invention starts with the discovery that it is a better plan to have recourse to a circuit arrangement in which oscillations are feasible when a capacitive impedance is inserted between grid and cathode, because in this case the parallel connection with relation to the crystal of a choke coil could be dispensed with. Such a tube transmitter arrangement can be created by having a regenerative coupling between the plate circuit and the grid circuit and which is not effected directly by electrical connection of the plate and grid circuit in one and the same tube, in line with the usual practice, but by first transferring or feeding the amplified potentials of the plate circuit to another thermionic tube, whose plate circuit is then made to react upon the grid circuit of the first tube with which the crystal is connected. This is accomplished by the connection of the grid circuit of the first tube through a condenser with the plate circuit of the second tube.

A theoretical consideration shows that the potentials and currents in said plate circuit of the second tube are in phase opposition with comparison to the potentials and currents in the plate circuit of the first tube, so that in the presence of capacitive back coupling between the plate circuit of the second tube and the grid circuit of the first tube, requirements as to the phase are fulfilled for self oscillations (trigger action) whenever the grid circuit of the first tube has a capacitive character, rather than an inductive nature.

Figure 2:
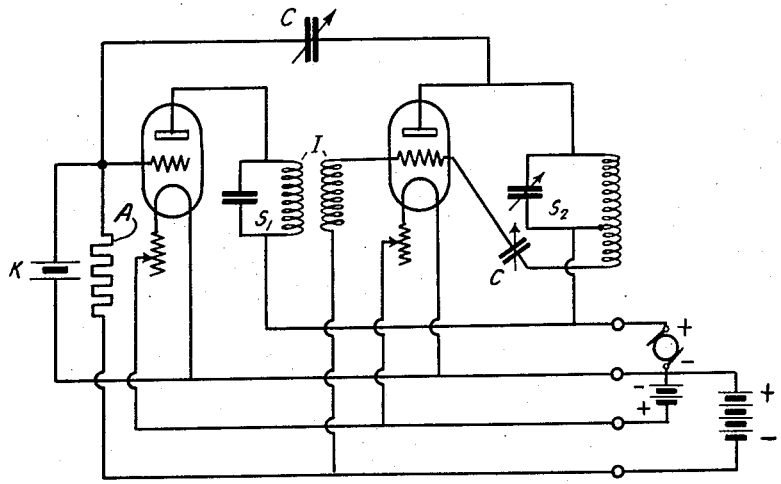

The object of my invention will be apparent when the following description and claim are read in connection with the accompanying drawing: wherein, Fig. 1 shows a circuit according to my invention in which two tubes are connected cascade fashion by resistance coupling, while, Fig. 2 shows another embodiment in which the two tubes are connected by inductive means, that is, the plate circuit of the first tube contains an oscillation circuit which is brought to act inductively upon the grid of the second tube.

Considering Fig. 1, tubes 1 and 2 are connected cascade fashion by resistance coupling R. This is well known in the art and need not here be further described. K is the piezo-electric crystal, said crystal being connected to the grid of tube 1 which grid is fed with potentials from the plate circuit of tube 2. This plate circuit comprises the oscillation circuit S by way of the condenser C. An ohmic resistance A is connected between the grid and cathode of tube 1, which as is evident in Fig. 1, is in parallel with the crystal K. Fig. 2 differs from Fig. 1 by that the two tubes are not connected with each other directly through a capacitance and resistance, but rather by inductive means, that is, the plate circuit of the first tube further contains an oscillation circuit S1 which is brought to act inductively upon the grid of the second tube. In the plate circuit of the second tube there is connected an oscillation circuit S2, said circuit being united with a grid of the second tube by way of a condenser C. The two herein circuits shown by way of example prove to be particularly favorable in practice but it is to be understood that wide diversions from said circuits may be made and still come within the scope of this invention. It must be also understood and noted that this scheme is not limited to an arrangement comprising two tubes, but that a greater number thereof may be connected in series, potentials being supplied to the grid of the tube with which the crystal is combined from the plate circuit of a subsequent tube care having to be taken so that the A. C. potentials arising in the plate circuit of this tube have the proper phase relationship.

The coupling condenser is preferably made of the variable kind in order to make the back feed adjustable.

Having thus described my invention, what I claim as my invention is:

A system for generating oscillations comprising a vacuum tube having a grid a filament and a plate, a two electrode piezo-electric crystal, a connection from one electrode thereof to said grid and a connection from the other electrode thereof to said filament, a circuit for polarizing said grid comprising the series connection of a source of potential and a resistor connected across said grid and filament, a parallel tuned circuit comprising an inductance coil and a condenser connected between said plate and filament, a second electron discharge device coupled to said vacuum tube, said electron discharge device having an anode a cathode and a control grid, an inductance connected between said control grid and cathode, said inductance being inductively connected to the inductance of said parallel tuned circuit, a tuned circuit comprising an inductance coil and a variable condenser, said variable condenser shunting a portion of said inductance coil, said tuned circuit being connected between said anode and said cathode, a neutralizing circuit comprising a variable condenser connected to the control grid of said device and to the unshunted portion of said last mentioned coil, for preventing self oscillation of said device, and a variable feed back condenser connected across the anode of said device and the grid of said vacuum tube for establishing desired feed back and oscillation generation under the control of said piezo-electric crystal.

KURT HEEGNER.